United States Patent Office 3,374,254
Patented Mar. 19, 1968

3,374,254
6-KETO-ESTRONE AND PROCESS FOR THE PRODUCTION THEREOF
Luciano Re, South Orange, N.J., assignor to Merck & Co., Inc., Rahway, N.J., a corporation of New Jersey
No Drawing. Filed Aug. 18, 1965, Ser. No. 480,764
22 Claims. (Cl. 260—397.4)

ABSTRACT OF THE DISCLOSURE

The invention disclosed herein is concerned with a novel synthesis of optically active estrone lower alkyl ethers and intermediate compounds useful in the synthesis of optically active estrone lower alkyl ethers. More particularly, this invention relates to a total synthesis of optically active estrone lower alkyl ethers in which inexpensive starting materials are used and which has the advantage that resolution is accomplished in an early stage of the synthesis. In this synthesis, 3-(p-alkoxybenzoyl)-propionic acid is reacted with vinyl magnesium bromide to form 4-(p-alkoxyphenyl)-4-vinyl-4-hydroxybutyric acid, which is then condensed with 2-methylcyclopentane-1,3-dione thereby producing 3-alkoxy-14,17-diketo-5(6),8(14) - diseco - 1,3,5(10),9(11) - estratetraene-6-oic acid. The latter compound is then reacted with p-toluene sulfonic acid and an optically active alcohol to form a mixture of diastereoisomeric esters of 3-alkoxy-17-keto-5(6)-seco-1,3,5(10),8,14 - estrapentaene-6-oic acid which are separated by fractional crystallization. The individual isomers are then separately reacted with a saponifying agent, and the resulting isomeric acids are reacted first with hydrogen thereby reducing the $\Delta^{14}$-double bond and then with potassium in liquid ammonia thereby reducing the $\Delta^8$-double bond, to form the 3-alkoxy-17-keto-5(6)-seco-1,3,5(10)-estratriene-6-oic acid isomers. The last named compound is then reacted with a strong acid thereby closing the B-ring, and the resulting l- and d-isomers of 6-keto-estrone 3-alkyl ether are reacted with hydrogen to produce the desired d- and l-isomers of estrone 3-alkyl ether.

The novel synthesis of this invention is illustrated in the following reaction flow diagram, wherein $R_1$ is a lower alkyl substituent, preferably having not more than five carbon atoms; $R_2$ is an optically active substituent, such as an optically active substituent of the terpene series, including l-bornyl and l-menthyl substituents; and X is bromine or chlorine:

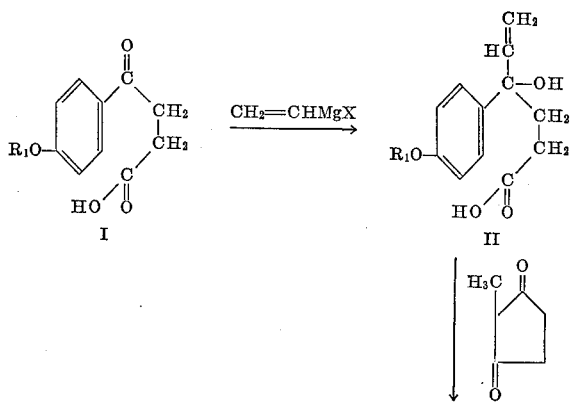

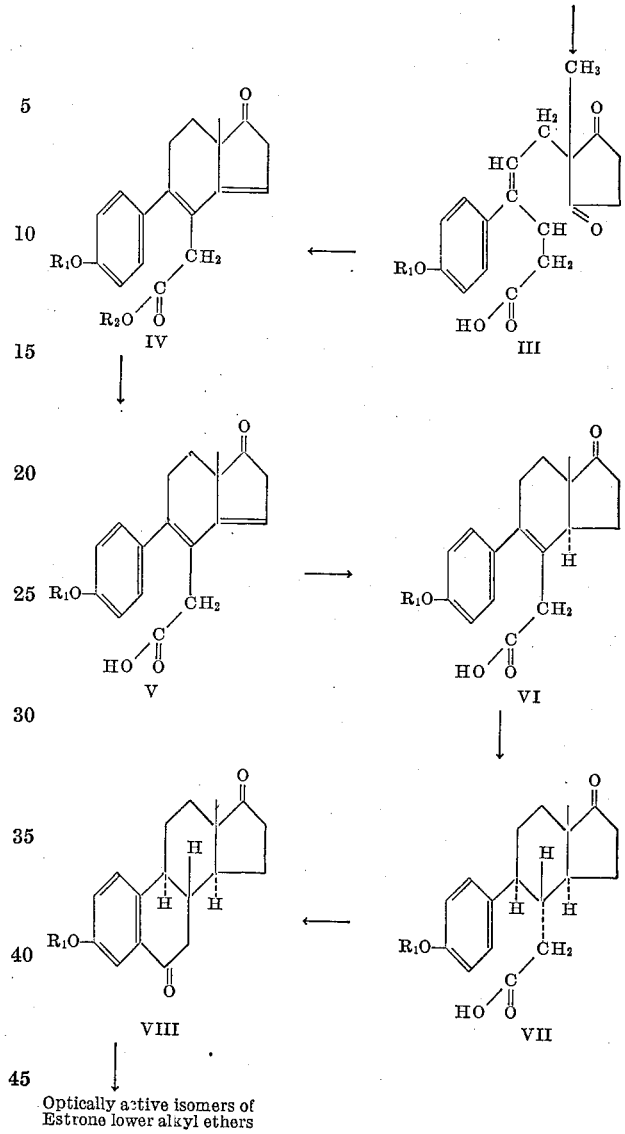

Optically active isomers of Estrone lower alkyl ethers

The first step in the novel synthesis of this invention is the reaction of 3-(para-lower alkoxybenzoyl)-propionic acid (Compound I) with vinyl magnesium bromide or chloride in tetrahydrofuran-diethyl ether solution to provide 4-(paralower alkoxyphenyl)-4 - vinyl - 4 - hydroxybutyric acid (Compound II). The second step is the reaction of Compound II with 2-methylcyclopentane-1,3-dione in a solution of a strong base, such as sodium or potassium methoxide, sodium or potassium carbonate, potassium hydroxide, potassium tertiarybutoxide, or "Triton B" in a lower aliphatic alcohol or mixture of aliphatic alcohols having a boiling point of at least 80° C., such as tertiary-butyl alcohol, a mixture of methanol and tertiary-butyl alcohol, or an aliphatic alcohol-aromatic hydrocarbon solvent mixture, such as a tertiary-butanol-xylene mixture, to provide 3-lower alkoxy-14,17-diketo-5(6),8(14)-diseco-1,3,5(10),9(11)-estratetraen - 6 - oic acid (Compound III). In the third step, the C-ring is closed and an ester of an optically active alcohol is formed by the reaction of a solution of Compound III in an organic solvent, such as benzene, toluene, or xylene, with an optically active alcohol, such as l-menthol or l- borneol, in the presence of a small amount of para-toluenesulfonic acid, in a manner to remove the water formed, to provide a 3-lower alkoxy-17-keto-5(6)-seco-1,3,5(10),8,14-estrapentaen-6-oic acid ester of an optically active alcohol (Compound IV) in the form of a mixture of diastereoisomeric esters which are separated by fractional crystallization from a suitable solvent, such as chloroform-hexane or ethanol-hexane. In the fourth and subsequent steps of the synthesis the diastereoisomeric compounds are reacted separately so that both isomers of the end product are obtained in pure form. The fourth step is the sapanoification of the disastereoisomeric esters obtained from the third reaction step, to provide 3-lower alkoxy-17-keto-5(6)-seco - 1,3,5(10),8,14 - estrapentaen-6-oic acid isomers (Compound V). In the fifth step, the $\Delta^{14}$-double bond of Compound V is hydrogenated to provide the 3-lower alkoxy-17-keto-5(6)-seco-1,3,5(10),8-estratetraen-6-oic acid isomers (Compound VI). The $\Delta^8$-double bond of Compound VI is reduced to a single bond by the use of potassium in liquid ammonia in the sixth step, to provide the 3-lower alkoxy-17-keto-5(6)-seco-1,3,5(10)-estratrien-6-oic acid isomers (Compound VII). The seventh step is the treatment of Compound VII with a strong acid, such as polyphosphoric acid, hydrofluoric acid, or sulfuric acid, to close the B-ring and provide the 6-keto-estrone lower alkyl ether isomers (Compound VIII). Closure of the B-ring may also be accomplished by forming the acid chloride of Compound VII and treating a solution of the acid chloride in an organic solvent, such as methylene chloride, benzene, toluene or xylene, with a Lewis acid, such as aluminum chloride. In the final step of the synthesis, the 6-keto group of Compound VIII is hydrogenated to provide d- and l-estrone lower alkyl ethers.

The first step in the synthesis is conveniently accomplished by adding a solution of 3-(para-lower alkoxybenzoyl)-propionic acid in dry tetrahydrofuran with stirring to a solution of vinyl magnesium halide in dry tetrahydrofuran and absolute ether. The reaction mixture is kept under nitrogen and maintained at a temperature of about $-15°$ C. during the addition. After addition is complete, the temperature of the reaction mixture is allowed to come up to about 0° to about $-5°$ C. and the reaction mixture is kept at that temperature for about one hour, allowed to come to room temperature and kept at room temperature overnight and then heated to 40° C. for about three hours. The reaction product is isolated by cooling the reaction mixture to about 0° C. and adding an ice-cold solution of dilute hydrochloric acid until the reaction mixture is acidic to Congo red. The reaction mixture is extracted with ethyl acetate and the ethyl acetate solution is dried over anhydrous magnesium sulfate. The solvent is removed by distillation under reduced pressure and the residue is triturated with ether. 4-(para-lower alkoxyphenyl)-4-vinyl-4-hydroxybutyric acid is obtained upon filtration.

In the second step of the synthesis, a reaction mixture comprising a mixture of 4-(para-lower alkoxyphenyl)-4-vinyl-4-hydroxybutyric acid, 2-methyl-cyclopentane-1,3-dione and a strong base in an aliphatic alcohol or mixture of aliphatic alcohols, which may also contain an aromatic hydrocarbon, such as xylene, having a boiling point of at least 80° C. is heated to the boiling point of the solvent or solvent mixture used. The 2-methyl-cyclopentane-1,3-dione gradually goes into solution as the temperature rises. The reaction mixture is refluxed for about one and one-half hours and then cooled to room temperature. A solvent, such as methylene chloride, is added to the reaction to precipitate excess 2-methyl-cyclopentane-1,3-dione and the precipitate is filtered off. 3-lower alkoxy - 14,17 - diketo - 5(6),8(14) - diseco - 1,3,5(10),9(11)-estratetraen-6-ioc acid obtained by removing the solvent by distillation under reduced pressure, adding aqueous potassium carbonate solution to the residue, acidification of the alkaline solution to Congo red while the temperature is from 0° C. to 5° C., and removal of the precipitated acid by filtration.

The third reaction step is accomplished by refluxing a solution of 3-lower alkoxy-14,17-diketo-5(6),8(14)-diseco-1,3,5(10),9(11)-estratetraen-6-oic acid and an optically active alcohol, such as l-menthol or l-borneol, in benzene containing a small amount of para-toluenesulfonic acid, in a system containing a water separator so that the water formed during the course of the reaction is removed from the reaction mixture. After refluxing until no more water is produced by the reaction, the reaction mixture is cooled to room temperature and washed with cold aqueous sodium bicarbonate solution and then with water. The benzene is removed by distillation under reduced pressure and any excess optically active alcohol is removed by steam distillation. The residue is a mixture of the two diastereoisomeric 3-lower alkoxy-17-keto-5(6)-seco-1,3,5(10),8,14-estrapentaen-6-oic acid esters. The separate optically active esters of 3-lower alkoxy-17-keto-5(6)-seco-1,3,5(10),8,14-estrapentaen-6-oic acid are obtained by fractional crystallization of the diastereoisomeric ester mixture from a suitable solvent, such as a chloroform-hexane or ethanol-hexane solvent mixture.

The separate isomers of 3-lower alkoxy-17-keto-5(6)-seco-1,3,5(10),8,14-estrapentaen-6-oic acid are obtained upon the saponification of the optically active esters. Saponification is accomplished by heating under nitrogen the separate optically active esters in an ethanol solution of a strong base, such as sodium or potassium hydroxide, removing the ethanol by distillation under reduced pressure, adding water to the residue, extracting with ether, removing and acidifying the aqueous phase to Congo red with an acid, such as hydrochloric acid while the temperature is at 0° to 5° C., and filtering to obtain the precipitated optically active 3-lower alkoxy-17-keto-5(6)-seco-1,3,5(10),8,14-estrapentaen-6-oic acid isomers.

In the fifth and subsequent steps of the synthesis, the two isomers undergo the same reaction conditions but are kept separate.

The fifth step of the synthetis is accomplished by hydrogenating a solution of 3-lower alkoxy-17-keto-5(6)-seco-1,3,5(10),8,14-estrapentaen-6-oic acid in tetrahydrofuran containing 10% palladium on calcium carbonate at atmospheric pressure until one molecular equivalent of hydrogen is absorbed. 3-lower alkoxy-17-keto-5(6)-seco-1,3,5(10),8-estratetraen-6-oic acid is isolated by filtration to remove the catalyst and removal of the solvent by distillation under reduced pressure. The residue is 3-lower alkoxy - 17 - keto - 5(6) - seco - 1,3,5(10),8 - estratetraen-6-oic acid and is recrystallized from a suitable solvent, such as a hexane-ethanol solvent mixture.

In the sixth step of the synthesis, a solution of 3-lower alkoxy - 17 - keto - 5(6) - seco - 1,3,5(10),8 - estratetraen-6-oic acid in tetrahydrofuran is added to a solution of potassium in liquid ammonia. When this addition is complete, an additional amount of potassium is added in small amounts to the reaction mixture. The temperature during the addition is maintained at from about $-40°$ C. to $-50°$ C. and after addition is complete the reaction mixture is maintained at the same temperature and stirred for a period of about two hours. To isolate the reaction product, ammonium chloride is added to the reaction mixture in an amount in excess of that required to react with the potassium in the reaction mixture. The ammonia is allowed to evaporate and the tetrahydrofuran is removed by distillation under reduced pressure. Water is added and the solution is made acid to Congo red by the addition of a dilute acid solution, such as diluted hydrochloric acid. The precipitated 3-lower alkoxy-17-keto-5(6)-seco-1,3,5(10)-estratrien-6-oic acid is collected by filtration and purified by recrystallization from a suitable solvent, such as an ethanol-hexane solvent mixture.

The seventh step of the synthesis is accomplished by stirring 3-lower alkoxy-17-keto-5(6)-seco-1,3,5(10)-estratrien-6-oic acid with a strong acid, such as phosphoric, acid or sulfuric acid, at a temperature of about 80° C. for about thirty minutes and then pouring the hot reaction mixture onto crushed ice. The reaction mixture is allowed to stand overnight and then extracted with methylene chloride. The methylene chloride solution is washed with aqueous sodium carbonate solution, washed with water, dried over sodium sulfate and filtered. The solvent is removed by distillation under reduced pressure. The residue is 6-keto-estrone lower alkyl ether and is purified by recrystallization from a suitable solvent, such as methanol.

The reduction of the eighth step of the synthesis is accomplished by hydrogenating a solution of 6-keto-estrone lower alkyl ether in a glacial acetic acid containing a small amount of perchloric acid and a small amount of 30% palladised charcoal at room temperature and atmospheric pressure until two molecular equivalents of hydrogen are absorbed. After hydrogenation is complete, the catalyst is removed by filtration and water is added to the filtrate. d-Estrone lower alkyl ether is isolated from the filtrate by extraction with methylene chloride, washing the organic phase with water, then with dilute aqueous sodium carbonate solution and finally with saturated aqueous sodium chloride solution. The methylene chloride solution is then dried over magnesium sulfate and filtered. The solvent is removed by distillation under reduced pressure and the crude residue of estrone lower alkyl ether is purified by recrystallization from a suitable solvent, such as methanol.

The following examples illustrate methods of carrying out the present invention, but it is to be understood that these examples are given for purposes of illustration and not of limitation.

EXAMPLE 1

*4-(para-methoxyphenyl)-4-vinyl-4-hydroxybutyric acid*

A solution of 26.4 g. of vinyl bromide in 32 ml. of ice-cold dry tetrahydrofuran is added dropwise with stirring to a suspension of 4.2 g. of magnesium shavings in 54 ml. of tetrahydrofuran containing a few crystals of iodine, the suspension being under nitrogen at a temperature of 37° C. and fitted with a Dry Ice condenser. The reaction temperature is kept during the addition at a temperature of 38 to 44° C. The addition requires about 30 minutes and at the end of the addition the reaction mixture is refluxed for an additional 30 minutes. The reaction mixture is then slowly cooled to −20° C. with strong agitation and diluted with 70 ml. of dry ether. 11.1 grams of 3-(para-methoxybenzoyl)-propionic acid in solution in 100 ml. of dry tetrahydrofuran is added dropwise with stirring to the solution of the Grignard reagent. During the addition the reaction mixture is kept under a blanket of nitrogen and the temperature is maintained at about −15° C. After addition is complete, the reaction mixture is allowed to come to about 0° to 5° C. and is maintained at that temperature for one hour and then allowed to come to room temperature and to stand at room temperature overnight. The reaction mixture is finally heated to 40° C. and maintained at that temperature for three hours, then cooled to 0° C. and acidified to Congo red with ice-cold dilute hydrochloric acid solution. The reaction product is removed by extraction of the solution with ethyl acetate and the extract is dried over anhydrous magnesium sulfate. The solvent is removed by distillation under reduced pressure and the residue is triturated with ether. 4-(para-methoxyphenyl)-4-vinyl-4-hydroxybutyric acid is obtained by filtration.

EXAMPLE 2

*3-methoxy-14,17-diketo-5(6),8(14)-diseco-1,3,5(10), 9(11)-estratetraen-6-oic acid*

A mixture of 1.97 g. of 4-(para-methoxyphenyl)-4-vinyl-4-hydroxybutyric acid, 1.65 g. of 2-methylcyclopentane-1,3-dione, 0.93 ml. of a 40% methanolic solution of "Triton B," 13 ml. of tertiary-butyl alcohol and 7 ml. of xylene is refluxed for two hours. The reaction mixture is then cooled to room temperature and 120 ml. of methylene chloride are added to precipitate any excess 2-methylcyclopentane-1,3-dione. The precipitate is removed by filtration, and the solvents are removed from the filtrate by distillation under reduced pressure. The residue is extracted with aqueous sodium carbonate solution. The aqueous sodium carbonate solution is acidified to Congo red while at 0° to 5° C. with dilute hydrochloric acid to precipitate 3 - methoxy - 14,17 - diketo-5(6),8(14)-diseco-1,3,5(10),9(11)-estratetraen-6-oic acid, which is collected by filtration.

EXAMPLE 3

*3-methoxy-17-keto-5(6)-seco-1,3,5(10),8,14-estrapentaen-6-oic acid 1-menthyl ester*

A mixture of 17.2 g. of 3-methoxy-14,17-diketo-5(6),8(14) - diseco - 1,3,5(10),9(11) - estratetrien - 6-oic acid, 0.4 g. of para-toluenesulfonic acid and 24 g. of 1-menthol in 160 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and unreacted 1-menthol is removed by steam distillation. The residue is a mixture of the two diastereo-isomeric 1-methyl esters of 3 - methoxy - 17 - keto - 5(6) - seco - 1,3,5(10),8,14-estrapentaen-6-oic acid. The mixture is fractionally recrystallized from chloroform-hexane solution to separate and obtain the two isomers of 3-methoxy-17-keto-5(6)-seco-1,3,5(10),8,14 - estrapentaen - 6 - oic acid 1-menthyl ester in pure form.

EXAMPLE 4

*d- and 1-3-methoxy-17-keto-5(6)-seco-1,3,5(10), 8,14-estrapentaen-6-oic acid*

A solution of 20 g. of d-3-methoxy-17-keto-5(6)-seco-1,3,5(10),8,14-estrapentaen-6-oic acid 1-menthyl ester, in 200 ml. of ethanol containing 3.86 g. of potassium hydroxide is refluxed for four hours under nitrogen. The ethanol is removed by distillation under reduced pressure, water is added to the residue and this mixture is extracted with ether to remove the non-acidic materials. The aqueous phase is then acidified to Congo red while at 0° to 5° C. with dilute hydrochloric acid and the precipitated optically active 3-methoxy-17-keto-5(6)-seco-1,3,5(10),8,14-estrapentaen-6-oic acid is collected by filtration.

The laevo isomer of 3-methoxy-17-keto-5(6)-seco-1,3,5(10),8,14-estrapentaen-6-oic acid 1-menthyl ester is saponified according to the same procedure to provide the optically active isomer of 3-methoxy-17-keto-5(6)-seco-1,3,5(10),8,14-estrapentaen-6-oic acid of opposite rotation.

EXAMPLE 5

*d- and 1-3-methoxy-17-keto-5(6)-seco-1,3,5(10),8-estratetraen-6-oic acid*

A solution of 5 g. of d-3-methoxy-17-keto-5(6)-seco-1,3,5(10),8,14-estrapentaen-6-oic acid in 200 ml. of tetrahydrofuran containing 5 g. of 10% palladised calcium carbonate is hydrogenated at room temperature and one atmosphere of pressure until one molecular equivalent of hydrogen is absorbed. The catalyst is removed from the reaction mixture by filtration and the solvent is removed by distillation under reduced pressure. The residue is optically active 3-methoxy-17-keto-5(6)-seco-1,3,5(10),8-estratetraen-6-oic acid and is recrystallized from ethanol-hexane solvent mixture.

The laevo isomer of 3-methoxy-17-keto-5(6)-seco-1,3,5(10),8,14-estrapentaen-6-oic acid is hydrogenated according to the same procedure to provide the optically active isomer 3-methoxy-17-keto-5(6)-seco-1,3,5(10),8-estratetraen-6-oic acid of opposite rotation.

EXAMPLE 6 d- and 1-3-methoxy-17-keto-5(6)-seco-1,3,5(10)-estratrien-6-oic acid

A solution of 2.8 g. of d-3-methoxy-17-keto-5(6)-seco-1,3,5(10),8-estratetraen-6-oic acid in 150 ml. of tetrahydrofuran is added with stirring to a solution of 1 g. of potassium metal in 700 ml. of liquid ammonia. Three more grams of potassium metal in small pieces are added gradually to the reaction mixture over a period of 10 minutes. The reaction mixture is stirred at a temperature of −40° C. to −50° C. for two hours and then 20 g. of ammonium chloride are added gradually. The ammonia is allowed to evaporate and the tetrahydrofuran is removed by distillation under reduced pressure. Water is added to the residue and this mixture is made acid to Congo red by the addition of dilute hydrochloride acid solution. The precipitated optically active 3-methoxy-17-keto-5(6)-seco-1,3,5(10)-estratrien-6-oic acid is collected by filtration and purified by recrystallization from an ethanol-hexane solvent mixture.

The laevo isomer of 3-methoxy-17-keto-5(6)-seco-1,3,5(10),8-estratetraen-6-oic acid is reduced according to the same procedure to provide the optically active isomer of 3-methoxy-17-keto-5(6)-seco-1,3,5(10)-estratrien-6-oic acid of opposite rotation.

EXAMPLE 7 d- and 1-6-keto-estrone methyl ether

Three grams of d-3-methoxy-17-keto-5(6)-seco-1,3,5(10)-estratrien-6-oic acid are stirred in 30 g. of polyphosphoric acid for 30 minutes at 80° C. The reaction mixture is then poured, while still hot, onto crushed ice and the resulting mixture is allowed to stand overnight and then extracted with methylene chloride. The methylene chloride solution is washed with aqueous sodium carbonate solution, washed with water, dried over anhydrous sodium sulfate and filtered. The solvent is removed by distillation under reduced pressure. The residue is optically active 6-keto-estrone methyl ether and is purified by crystallization from methanol.

The laevo isomer of 3-methoxy-17-keto-5(6)-seco-1,3,5(10)-estratrien-6-oic acid is treated according to the same procedure to provide the optically active isomer of 6-keto-estrone methyl ether of opposite rotation.

EXAMPLE 8 d- and 1-estrone methyl ether

A solution of 1 g. of d-6-keto-estrone methyl ether and 40 ml. of glacial acetic acid containing 0.2 ml. of 60% perchloric acid and 0.2 g. of 30% palladised charcoal is hydrogenated at room temperature and atmospheric pressure until two molecular equivalents of hydrogen are absorbed. The catalyst is removed by filtration and 400 ml. of water is added to the acetic acid solution. The dilute acetic acid solution is extracted with methylene chloride and the organic phase is separated and washed with water, aqueous sodium carbonate solution and saturated sodium chloride solution. The methylene chloride solution is dried over magnesium sulfate and filtered. The solvent is removed by distillation under reduced pressure. The residue is optically active estrone methyl ether and is purified by crystallization from methanol. Optically active estrone methyl ether of opposite rotation is obtained by hydrogenating 1-6-keto-estrone methyl ether according to the same procedure.

EXAMPLE 9 d- and 1-6-keto-estrone methyl ether

A solution of 0.245 g. of d-3-methoxy-17-keto-5(6)-seco-1,3,5(10)-estratrien-6-oic acid ether, 0.5 ml. of thionyl chloride and two drops of pyridine in 5 ml. of methylene chloride is allowed to stand at room temperature for two hours. The solvent is removed by distillation under reduced pressure and in order to remove all traces of thionyl chloride, 5 ml. of methylene chloride are added to the residue and the solvent is again removed by distillation under reduced pressure. The addition of the 5 ml. portion of methylene chloride and removal of the methylene chloride by distillation under reduced pressure is repeated two additional times. The residual acid chloride of d-3-methoxy-17-keto-5(6)-seco-1,3,5(10-estratrien-6-oic acid is dissolved in 5 ml. of methylene chloride and this solution is added dropwise over a period of five minutes to a stirred, ice-cold suspension of 0.38 g. of aluminum chloride in 10 m. of methylene chloride. After addition is complete, the reaction mixture is stirred for two hours at 0° to 5° C. and then for two hours at room temperature. Ice is then added to the reaction mixture followed by 5 ml. of concentrated hydrochloric acid solution and 20 ml. of methylene chloride are added. The organic layer is removed, washed with water, then with 5% aqueous potassium hydroxide solution and finally with water. The organic layer is dried over magnesium sulfate, filtered, and the solvent is removed by distillation under reduced pressure. The crude residue of optically active 6-keto-estrone methyl ether is crystallized from methanol.

Preparation of the acid chloride of the laevo isomer of 3-methoxy-17-keto-5(6)-1,3,5(10)-estratrien-6-oic acid and ring closure to provide optically active 6-keto-estrone methyl ether of opposite rotation is carried out in the same manner.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of a compound of the formula:

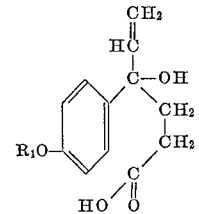

in which $R_1$ is a lower alkyl substituent, which comprises reacting a compound of the formula:

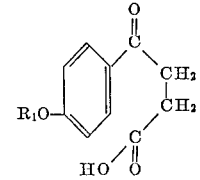

with vinyl magnesium bromide or chloride.

2. A process according to claim 1 in which the reaction is conducted in solution in tetrahydrofuran and diethyl ether.

3. A process for the preparation of a compound of the formula:

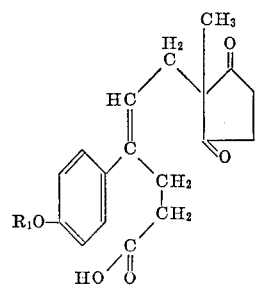

in which $R_1$ is a lower alkyl substituent, which comprises reacting a compound of the formula:

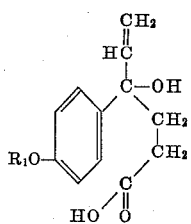

in which $R_1$ has the same significance as above, with 2-methylcyclopentane-1,3-dione, in solution in an organic solvent having a boiling point of at least 80° C., with a strong base.

4. A process for the preparation of a compound of the formula:

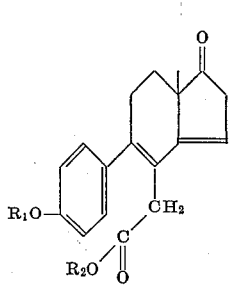

in which $R_1$ is a lower alkyl substituent and $R_2$ is an optically active substituent, which comprises reacting a compound of the formula:

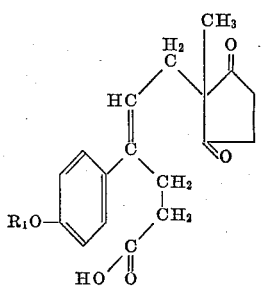

in which $R_1$ has the same significance as above, in solution in an organic solvent containing an optically active alcohol selected from 1-menthol and 1-borneol in the presence of para-toluenesulfonic acid; and separating the diastereoisomeric esters by fractional recrystallization.

5. A process according to claim 4 in which the optically active alcohol is 1-menthol.

6. A process according to claim 4 in which the optically active alcohol is 1-borneol.

7. A process for the preparation of the optically active isomers of a compound of the formula:

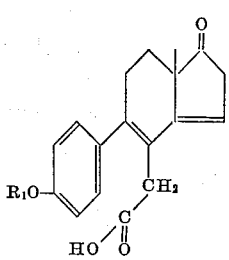

in which $R_1$ is a lower alkyl substituent, which comprises saponifying the optically active isomers of a compound of the formula:

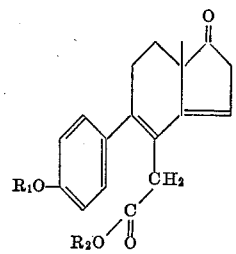

in which $R_1$ has the same significance as above and $R_2$ is an optically active substituent selected from the group consisting of 1-bornyl and 1-menthyl.

8. A process for the preparation of the optically active isomers of a compound of the formula:

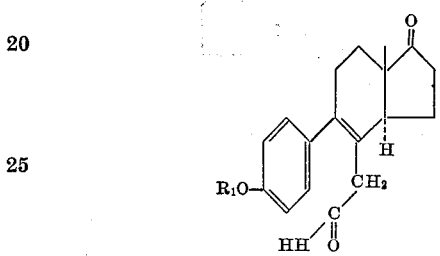

in which $R_1$ is a lower alkyl substituent, which comprises hydrogenating the $\Delta^{14}$-double bond of the optically active isomers of the compound of the formula:

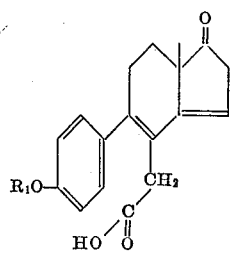

in which $R_1$ has the same significance as above.

9. A process for the preparation of the optically active isomers of the compound of the formula:

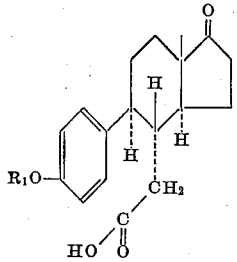

in which $R_1$ is a lower alkyl substituent, which comprises reducing with potassium in liquid ammonia the $\Delta^8$-double bond of the optically active isomers of the compound of the formula:

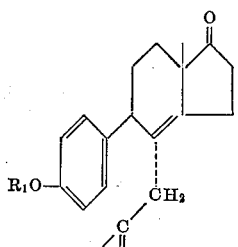

in which $R_1$ has the same significance as above.

10. A process for the preparation of the optically active isomers of the compound of the formula:

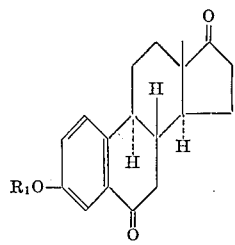

in which R₁ is a lower alkyl substituent, which comprises treating the optically active isomers of a compound of the formula:

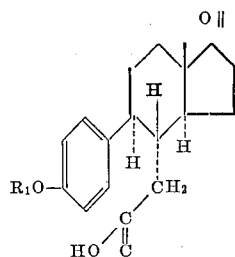

in which R₁ has the same significance as above, with a strong acid.

11. A process for the preparation of the optically active isomers of a compound of the formula:

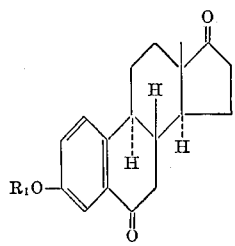

in which R₁ is a lower alkyl substituent, which comprises forming the acid chloride of the optically active isomers of the compound of the formula:

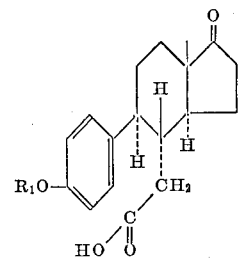

in which R₁ has the same significance as above, and treating a solution of the acid chlorides of the optically active isomers in an organic solvent with a Lewis acid.

12. A process according to claim 11 in which the organic solvent is methylene chloride and the Lewis acid is aluminum chloride.

13. A process for the preparation of the optically active isomers of estrone lower alkyl ether which comprises hydrogenating the optically active isomers of the compound of the formula:

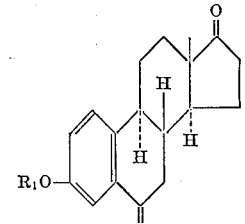

in which R₁ is a lower alkyl substituent.

14. A compound of the formula:

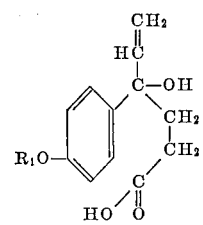

in which R₁ is a lower alkyl substituent.

15. A compound of the formula:

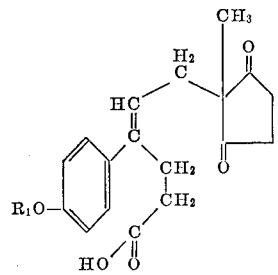

in which R₁ is a lower alkyl substituent.

16. A compound of the formula:

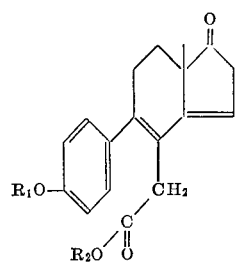

in which R₁ is a lower alkyl substituent and R₂ is an optically active substituent selected from the group consisting of 1-bornyl and 1-menthyl.

17. A compound according to claim 16 in which the optically active substituent is 1-bornyl.

18. A compound according to claim 16 in which the optically active substituent is 1-methyl.

19. The optically active isomers of a compound of the formula:

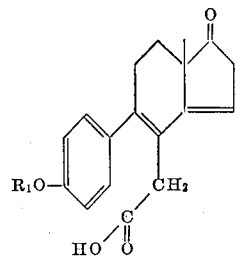

in which R₁ is a lower alkyl substituent.

20. The optically active isomers of a compound of the formula:

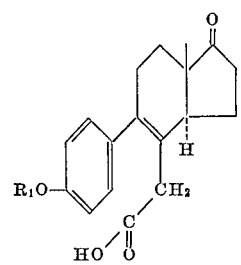

in which R₁ is a lower alkyl substituent.

21. The optically active isomers of a compound of the formula:

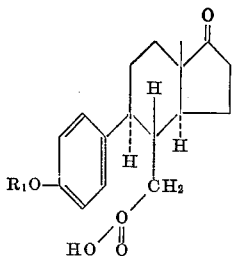

in which $R_1$ is a lower alkyl substituent.

22. The optically active isomers of a compound of the formula:

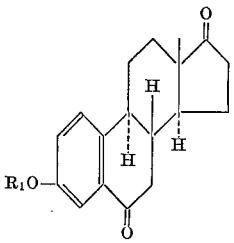

in which $R_1$ is a lower alkyl substituent.

References Cited

Crabbe et al.: Journal, Organic Chemistry, September 1964, vol. 29, No. 9, page 2732 relied on.

Caspi et al.: Journal, Chemical Society, (1966), page 1036 relied on.

ELBERT L. ROBERTS, *Primary Examiner.*